US011538438B2

(12) United States Patent
Bae et al.

(10) Patent No.: US 11,538,438 B2
(45) Date of Patent: Dec. 27, 2022

(54) ELECTRONIC DEVICE AND METHOD FOR EXTENDING TIME INTERVAL DURING WHICH UPSCALING IS PERFORMED ON BASIS OF HORIZONTAL SYNCHRONIZATION SIGNAL

(71) Applicant: SAMSUNG ELECTRONICS CO., LTD., Suwon-si (KR)

(72) Inventors: Jongkon Bae, Suwon-si (KR); Hojin Kim, Suwon-si (KR); Yohan Lee, Suwon-si (KR); Yunpyo Hong, Suwon-si (KR); Donghui Kim, Suwon-si (KR); Eunsook Seo, Suwon-si (KR); Dongkyoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/277,539

(22) PCT Filed: Sep. 19, 2019

(86) PCT No.: PCT/KR2019/012147
§ 371 (c)(1),
(2) Date: Mar. 18, 2021

(87) PCT Pub. No.: WO2020/060229
PCT Pub. Date: Mar. 26, 2020

(65) Prior Publication Data

US 2022/0036853 A1 Feb. 3, 2022

(30) Foreign Application Priority Data

Sep. 21, 2018 (KR) ........................ 10-2018-0113969

(51) Int. Cl.
*G06F 3/038* (2013.01)
*G09G 5/00* (2006.01)
(Continued)

(52) U.S. Cl.
CPC ............... *G09G 5/006* (2013.01); *G09G 5/12* (2013.01); *G09G 5/227* (2013.01)

(58) Field of Classification Search
CPC ........... G09G 5/006; G09G 5/12; G09G 5/227
(Continued)

(56) References Cited

U.S. PATENT DOCUMENTS 6,597,370 B1 7/2003 Lee
7,477,272 B2 1/2009 Baek et al.
(Continued)

FOREIGN PATENT DOCUMENTS

CN 1154624 7/1997
CN 101060607 10/2007
(Continued)

OTHER PUBLICATIONS

International Search Report for PCT/KR2019/012147, dated Jan. 10, 2020, 5 pages.
(Continued)

*Primary Examiner* — Jonathan M Blancha
(74) *Attorney, Agent, or Firm* — Nixon & Vanderhye, P.C.

(57) ABSTRACT

An electronic device according to various embodiments may include a display panel, a Display Driving Integrated Circuit (DDIC) operatively coupled to the display panel, and a processor operatively coupled to the DDIC. The DDIC may be configured to receive, from the processor, a signal indicating that a first resolution is to be converted to a second resolution while displaying an image at the first resolution through the display panel, based on a horizontal synchroni-
(Continued)

zation signal including a first porch interval, change a length of the porch interval in response to the reception, and display the image at the second resolution through the display panel, based on the horizontal synchronization signal including the porch interval having the changed length.

19 Claims, 11 Drawing Sheets

(51) Int. Cl.
*G09G 5/12* (2006.01)
*G09G 5/22* (2006.01)

(58) Field of Classification Search
USPC .......................................................... 345/204
See application file for complete search history.

(56) References Cited

U.S. PATENT DOCUMENTS

| | | | | |
|---|---|---|---|---|
| 8,446,484 | B2 | 5/2013 | Muukki et al. | |
| 8,797,457 | B2 | 8/2014 | Stevens | |
| 2003/0164897 | A1 | 9/2003 | Chen et al. | |
| 2005/0012738 | A1* | 1/2005 | Gong | G09G 5/006 345/212 |
| 2005/0078126 | A1 | 4/2005 | Park et al. | |
| 2007/0121395 | A1 | 5/2007 | Kim et al. | |
| 2008/0165178 | A1 | 7/2008 | Chu et al. | |
| 2008/0174601 | A1 | 7/2008 | Kashi | |
| 2009/0141011 | A1* | 6/2009 | Greb | G09G 3/3611 345/206 |
| 2011/0206249 | A1* | 8/2011 | Mathew | G16H 40/67 382/128 |
| 2012/0306926 | A1* | 12/2012 | Millet | G06T 3/4007 345/660 |
| 2014/0063069 | A1 | 3/2014 | Prabakaran | |
| 2014/0085321 | A1 | 3/2014 | Bae et al. | |
| 2015/0015591 | A1* | 1/2015 | Oh | G06F 3/14 345/519 |
| 2015/0062111 | A1 | 3/2015 | Roh et al. | |
| 2015/0103083 | A1 | 4/2015 | Obinata et al. | |
| 2015/0213787 | A1* | 7/2015 | Yoon | G09G 5/005 345/698 |
| 2015/0325164 | A1* | 11/2015 | Kim | G09G 3/3648 345/694 |
| 2016/0098812 | A1 | 4/2016 | Yoon et al. | |
| 2016/0125798 | A1 | 5/2016 | Park et al. | |
| 2016/0247437 | A1* | 8/2016 | Choi | G09G 3/2003 |
| 2017/0365230 | A1* | 12/2017 | Hu | G09G 5/003 |
| 2018/0040301 | A1 | 2/2018 | Bae et al. | |

FOREIGN PATENT DOCUMENTS

| | | |
|---|---|---|
| CN | 105427777 | 3/2016 |
| CN | 107925749 | 4/2018 |
| EP | 1 164 569 | 12/2001 |
| JP | 2001-67061 | 3/2001 |
| JP | 2001109436 | 4/2001 |
| JP | 2008-306660 | 12/2008 |
| KR | 10-0323666 | 2/2002 |
| KR | 10-2004-0008824 | 1/2004 |
| KR | 10-0510550 | 8/2005 |
| KR | 10-0761827 | 9/2007 |
| KR | 10-2015-0026530 | 3/2015 |
| KR | 10-2016-0052877 | 5/2016 |
| KR | 10-2018-0015038 | 2/2018 |
| TW | 200518598 | 6/2005 |

OTHER PUBLICATIONS

Written Opinion of the ISA for PCT/KR2019/012147, dated Jan. 10, 2020, 3 pages.
Extended Search Report dated Sep. 29, 2021 in counterpart European Patent Application No. 19863942.9.
Notification of First Office Action dated Mar. 29, 2022 in counterpart Chinese Patent Application No. 201980061739.4 and English-language translation.
Second Office Action dated Oct. 19, 2022 in counterpart Chinese Patent Application No. 201980061739.4 and English-language translation.

* cited by examiner

ELECTRONIC DEVICE AND METHOD FOR EXTENDING TIME INTERVAL DURING WHICH UPSCALING IS PERFORMED ON BASIS OF HORIZONTAL SYNCHRONIZATION SIGNAL

This application is the U.S. national phase of International Application No. PCT/KR2019/012147 filed 19 Sep. 2019, which designated the U.S. and claims priority to KR Patent Application No. 10-2018-0113969 filed 21 Sep. 2018, the entire contents of each of which are hereby incorporated by reference.

TECHNICAL FIELD

Various embodiments described below relate to an electronic device for extending a time interval during which upscaling is performed based on a horizontal synchronization signal to convert a resolution of a screen displayed through a display panel, and a method thereof.

BACKGROUND ART

An electronic device such as a smartphone, a tablet Personal Computer (PC), a smart watch, or the like may display a variety of content such as an image, a text, or the like. The display panel may be driven through a Display Driver Integrated Circuit (DDIC).

The DDIC may display the content by using the display panel according to a specified timing signal, through a plurality of pixels constituting the display panel.

Summary

A processor included in an electronic device may transmit data to a Display Driver Integrated Circuit (DDIC) included in the electronic device to display an image at a first resolution through a display panel included in the electronic device, based on a horizontal synchronization signal. The DDIC may up-scale the data to display the image at a second resolution higher than the first resolution through the display panel. Therefore, the electronic device may require a solution for extending a time interval for the up-scaling of the data.

Technical problems to be solved in the disclosure are not limited to the technical problems mentioned above, and other technical problems not mentioned herein can be clearly understood by those skilled in the art to which the disclosure pertains from the following descriptions.

An electronic device according to various embodiments may include a display panel, a Display Driving Integrated Circuit (DDIC) operatively coupled to the display panel, and a processor operatively coupled to the DDIC. The DDIC may be configured to receive, from the processor, first data to display an image at a first resolution, which is transmitted based on a horizontal synchronization signal including a second porch interval having a longer length than a first porch interval included in the horizontal synchronization signal used to display the image at the first resolution, based on the first data, obtain second data to display the image at a second resolution higher than the first resolution, based at least on the first data, and display the image at the second resolution by using the display panel, based on the obtained second data.

An electronic device according to various embodiments may include a display panel, a DDIC operatively coupled to the display panel, and a processor operatively coupled to the DDIC. The DDIC may be configured to receive, from the processor, a signal indicating that a first resolution is to be converted to a second resolution while displaying an image at the first resolution through the display panel, based on a horizontal synchronization signal including a first porch interval, change a length of the porch interval in response to the reception, and display the image at the second resolution through the display panel, based on the horizontal synchronization signal including the porch interval having the changed length.

A method for operating an electronic device according to various embodiments may include receiving, from the processor of the electronic device by a DDIC of the electronic device, first data to display an image at a first resolution, which is transmitted based on a horizontal synchronization signal including a second porch interval having a longer length than a first porch interval included in the horizontal synchronization signal used to display the image at the first resolution, based on the first data, obtaining, by the DDIC, second data to display the image at a second resolution higher than the first resolution, based at least on the first data, and displaying, by the DDIC, the image at the second resolution by using the display panel of the electronic device, based on the obtained 10 second data.

A method of operating an electronic device according to various embodiments may include receiving, from the processor of the electronic device by a DDIC of the electronic device, a signal indicating that a first resolution is to be converted to a second resolution while displaying an image at the first resolution through the display panel of the electronic device, based on a horizontal synchronization signal including a first porch interval, changing, by the DDIC, a length of the porch interval in response to the reception, and displaying, by the DDIC, the image at the second resolution through the display panel, based on the horizontal synchronization signal including the porch interval having the changed length.

An electronic device and a method thereof according to various embodiments can secure a time interval for performing up-scaling to convert a resolution, by extending a porch interval of a horizontal synchronization signal.

Advantages acquired in the disclosure are not limited to the aforementioned advantages. Other advantages not mentioned herein can be clearly understood by those skilled in the art to which the disclosure pertains from the following descriptions.

DETAILED DESCRIPTION

Figure 1:
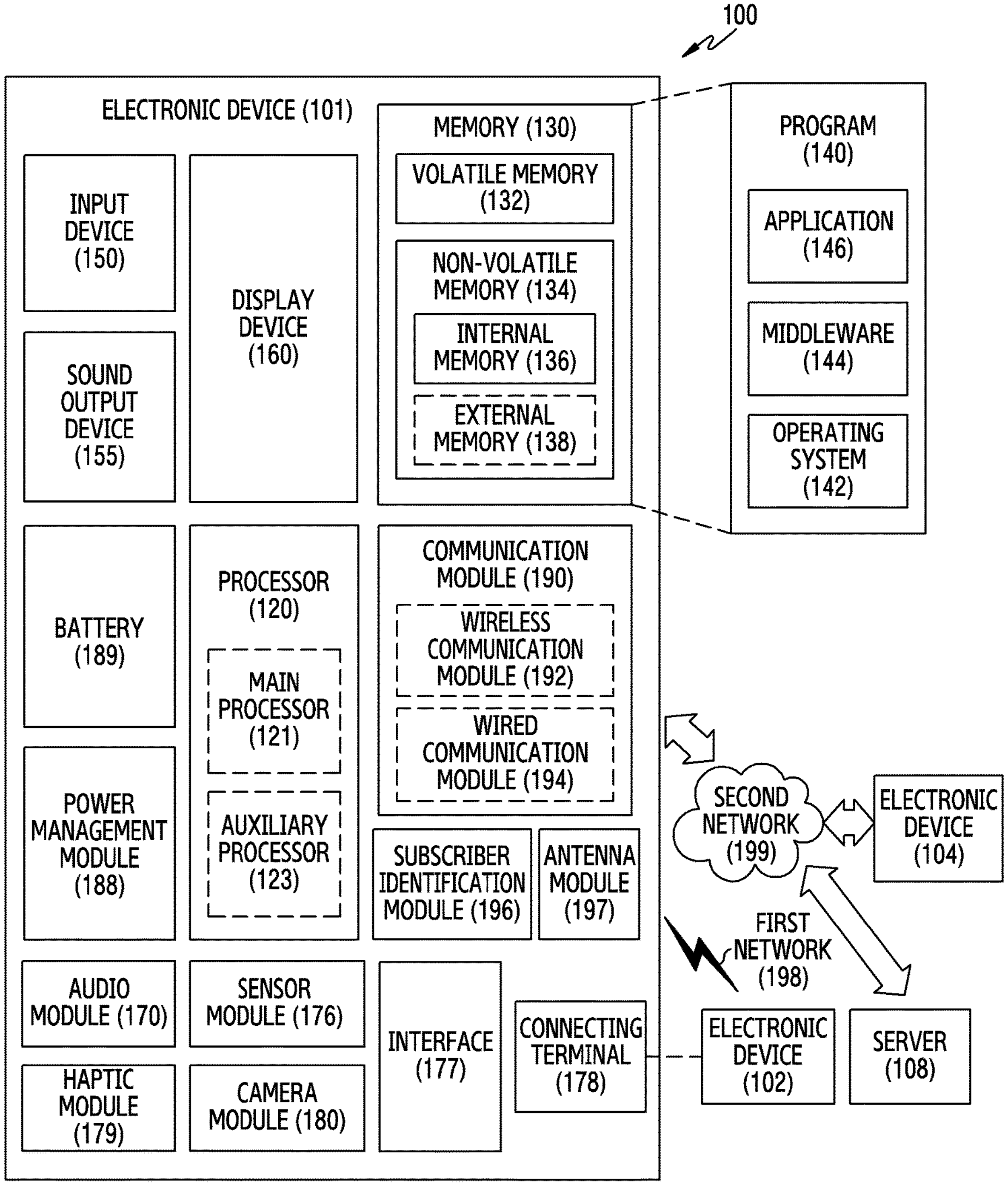
FIG. 1 is a block diagram of an electronic device in a network environment, which extends a time interval for performing up-scaling based on horizontal synchronization, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
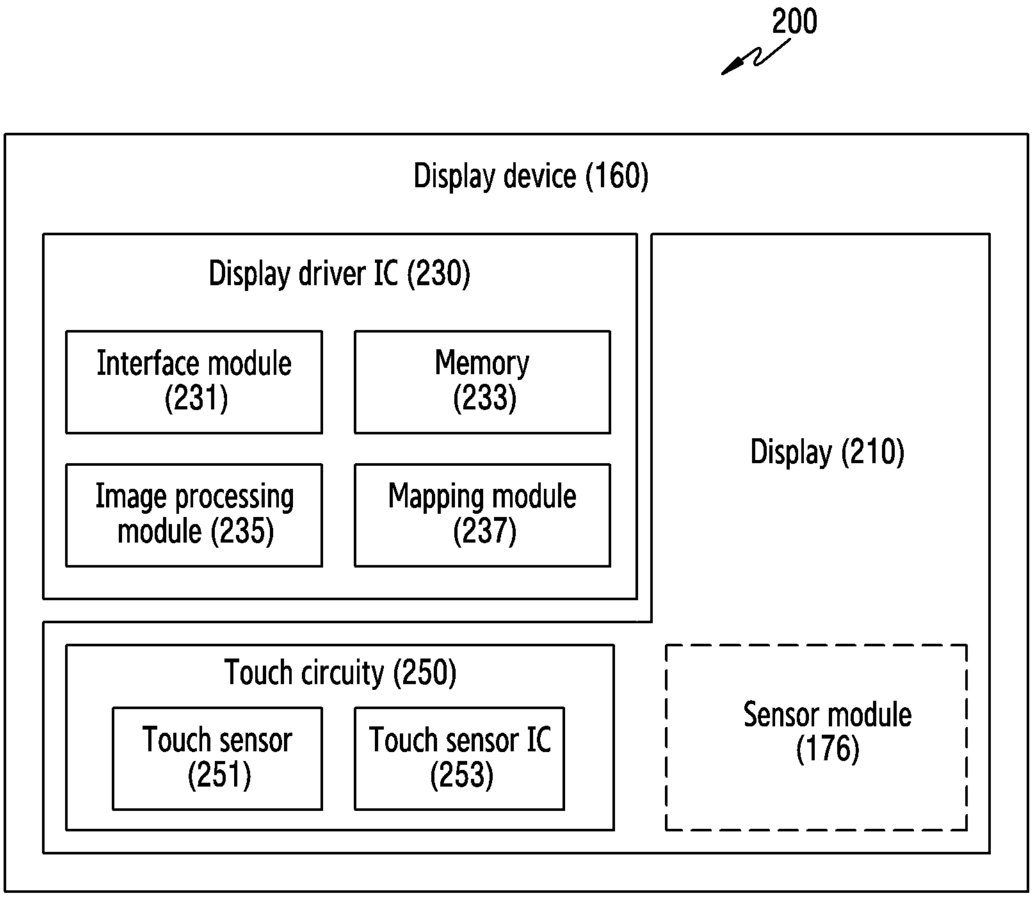
FIG. 2 is a block diagram of a display device which extends a time interval for performing up-scaling based on horizontal synchronization according to various embodiments.

FIG. 2 is a block diagram 200 illustrating the display device 160 according to various embodiments. Referring to FIG. 2, the display device 160 may include a display 210 and a Display Driver Integrated Circuit (DDI) 230 to control the display 210. The DDI 230 may include an interface module 231, a memory 233 (e.g., a buffer memory), an image processing module 235, or a mapping module 237. The DDI 230 may receive image information which includes image data or an image control signal corresponding to a command for controlling the image data from another component of the electronic device 101 through the interface module 231. For example, according to an embodiment, the image information may be received from the processor 120 such as the main processor 121 (e.g., an application processor) or the auxiliary processor 123 (e.g., a graphics processing unit) operated independently from the function of the main processor 121. The DDI 230 may communicate, for example, with a touch circuitry 250, the sensor module 176, or the like through the interface module 231. In addition, the DDI 230 may also store at least part of the received image information in the memory 233, for example, on a frame basis. The image processing module 235 may perform pre-processing or post-processing (e.g., adjustment of resolution, brightness, or size) with respect to at least part of the image data, based at least in part on a characteristic of the image data or a characteristic of the display 210. The mapping module 237 may generate a voltage value or current value corresponding to the image data pre-processed or post-processed through the image processing module 235. According to an embodiment, the generating of the voltage value or current value may be performed, for example, based at least in part on an attribute of pixels (e.g., an array, such as an RGB stripe or a pentile structure, of the pixels, or the size of each subpixel) of the display 210. At least some pixels of the display 210 may be driven, for example, based at least in part on the voltage value or current value such that visual information (e.g., a text, an image, or an icon) corresponding to the image data is displayed through the display 210.

According to an embodiment, the display device 160 may further include the touch circuitry 250. The touch circuitry 250 may include a touch sensor 251 and a touch sensor IC 253 for controlling the touch sensor 251. The touch sensor IC 253 may control the touch sensor 251 to detect a touch input or a hovering input with respect to a specific position on the display 210. For example, the touch sensor 251 may detect the touch input or the hovering input by measuring a change in a signal (e.g., a voltage, a quantity of light, a resistance, or a quantity of electric charge) corresponding to the specific position on the display 210. The touch circuitry 250 may provide the processor 120 with information (e.g., a position, an area, a pressure, or a time) regarding the detected touch input or hovering input. According to an embodiment, at least part (e.g., the touch sensor IC 253) of the touch circuitry 250 may be included as part of the DDI 230 or the display 210, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuitry thereof. In this case, the at least one sensor or the control circuitry thereof may be embedded in a portion (e.g., the display 210 or the DDI 230) of the display device 160 or a portion of the touch circuitry 250. For example, when the sensor module 176 embedded in the display device 160 includes a biometric sensor (e.g., a fingerprint sensor), the biometric sensor may obtain biometric information (e.g., a fingerprint image) associated with a touch input through some regions of the display 210. As another example, when the sensor module 176 embedded in the display device 160 includes a pressure sensor, the pressure sensor may obtain pressure information associated with a touch input through some or all regions of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
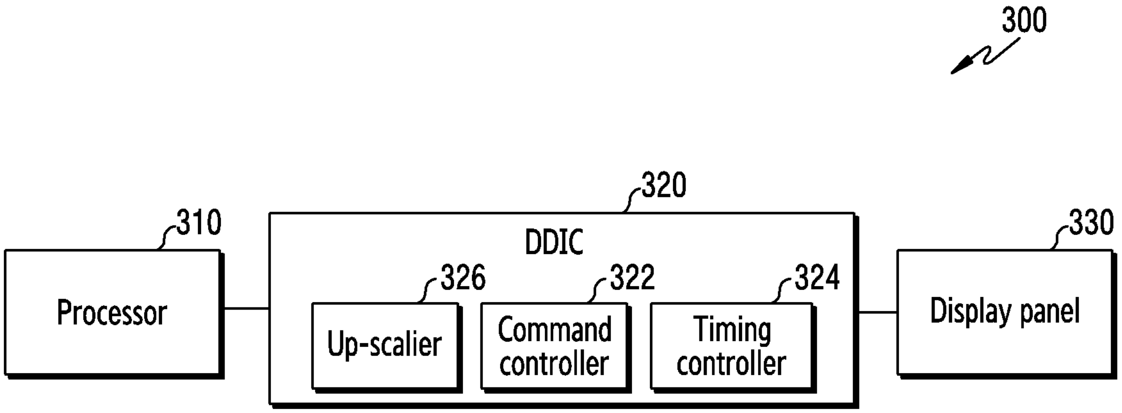
FIG. 3 illustrates an example of a functional configuration of an electronic device according to various embodiments.

FIG. 3 illustrates an example of a functional configuration of an electronic device according to various embodiments. Such a functional configuration may be included in the electronic device 101 of FIG. 1.

Figure 4A:
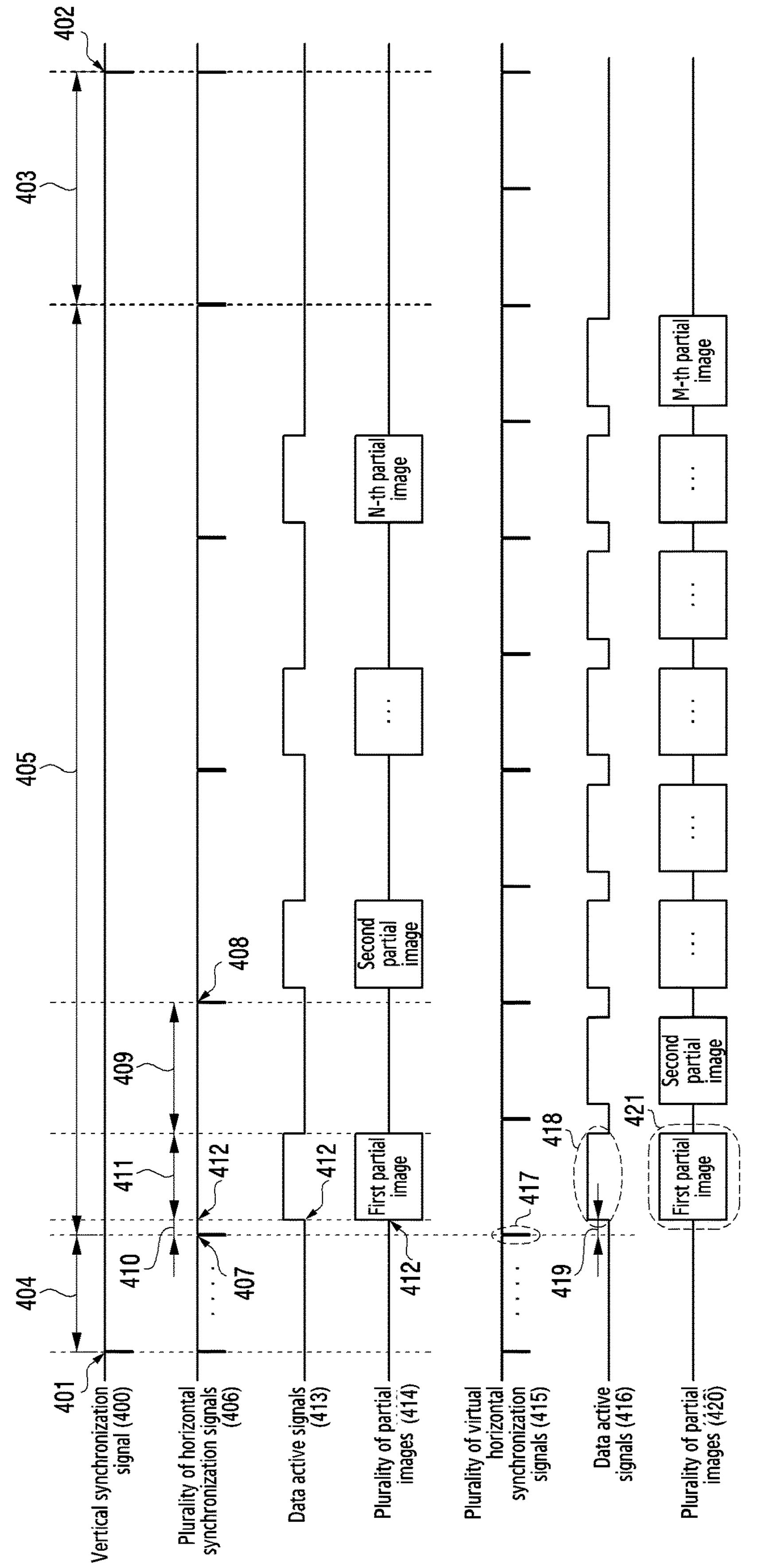
FIG. 4A illustrates an example of signals used in an electronic device which performs 4-times up-scaling according to various embodiments.

FIG. 4A illustrates an example of signals used in an electronic device which performs 4-times up-scaling according to various embodiments.

Figure 4B:
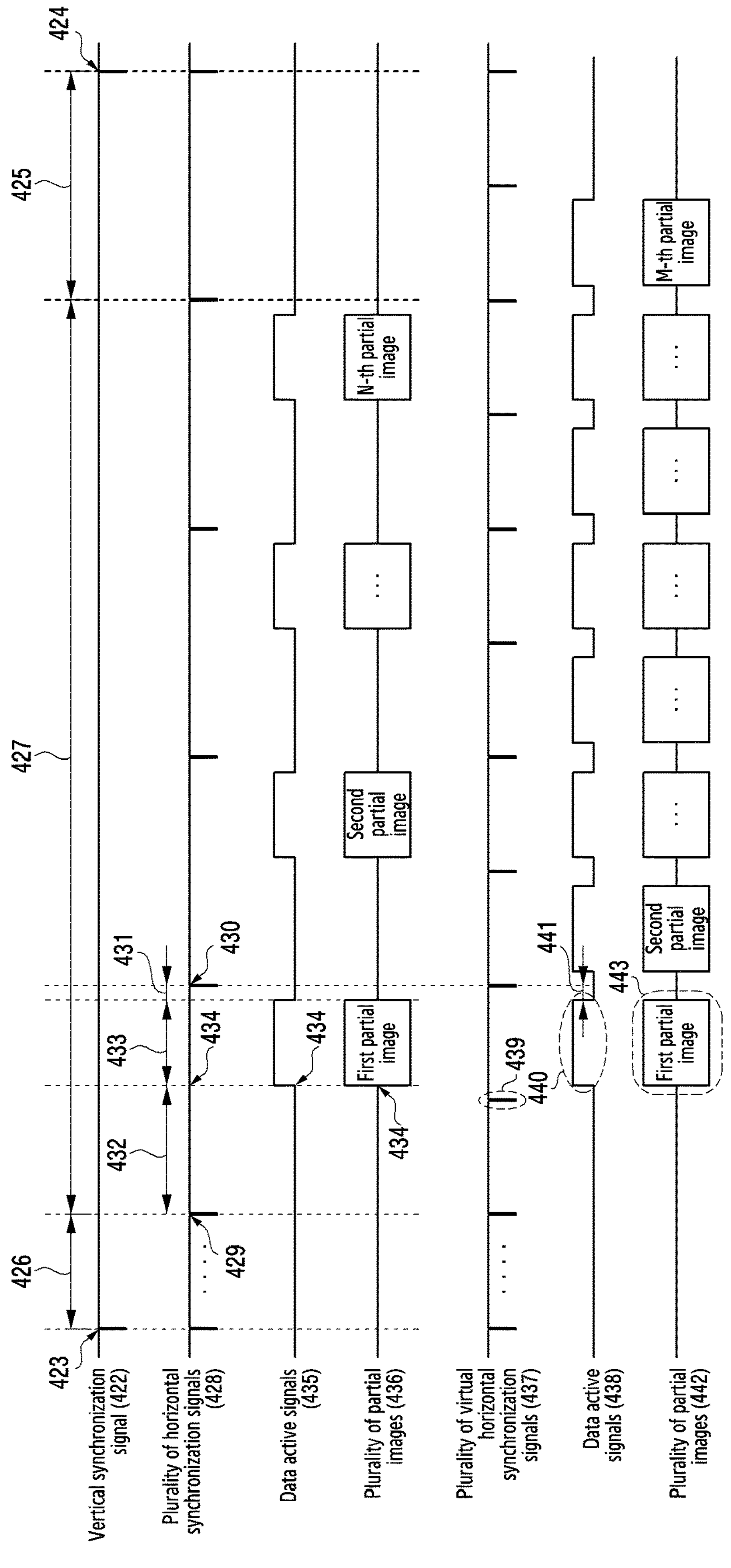
FIG. 4B illustrates another example of the signals used in the electronic device which performs 4-times up-scaling according to various embodiments.

FIG. 4B illustrates another example of the signals used in the electronic device which performs 4-times up-scaling according to various embodiments.

Figure 5A:
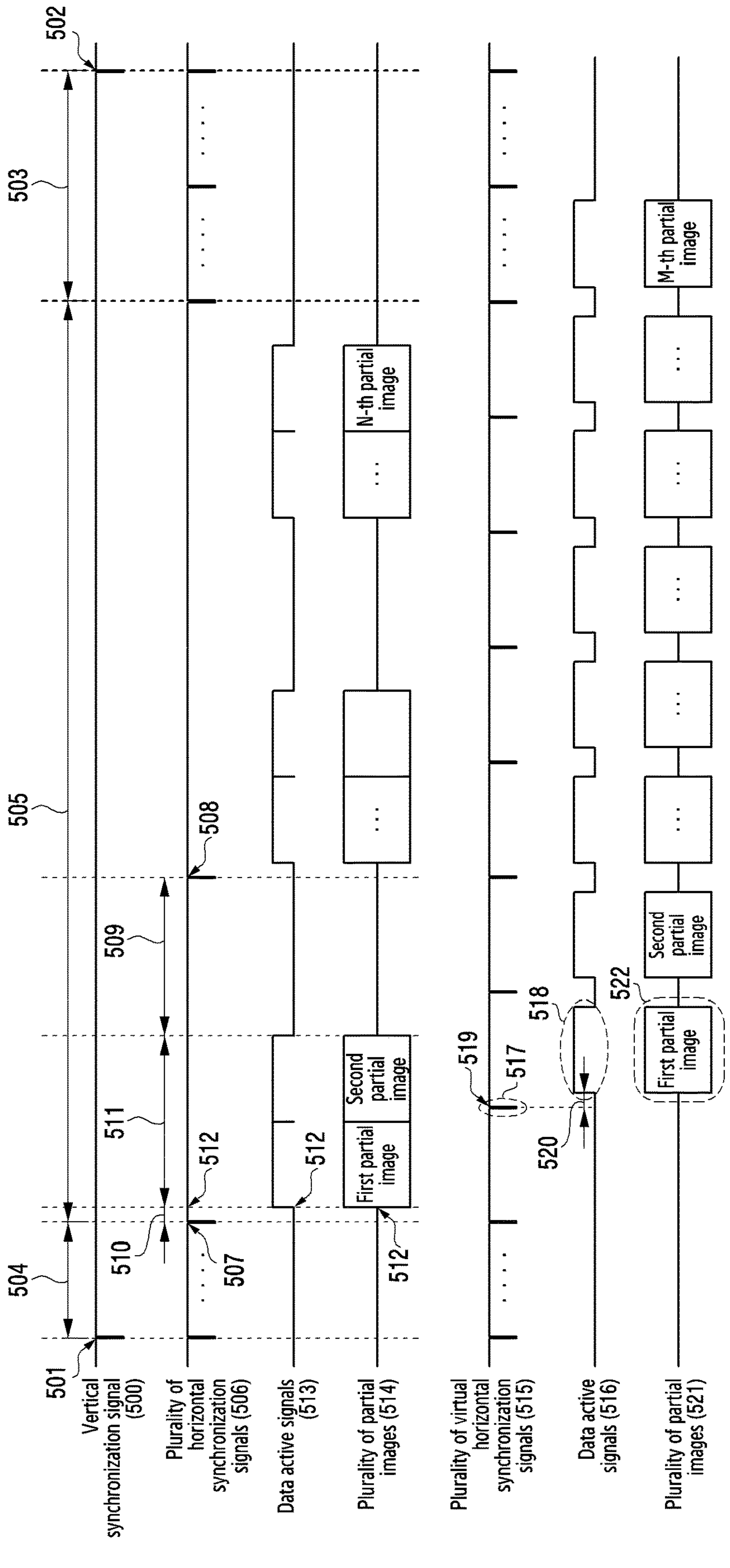
FIG. 5A illustrates an example of signals used in an electronic device which performs 2.25-times up-scaling according to various embodiments.

FIG. 5A illustrates an example of signals used in an electronic device which performs 2.25-times up-scaling according to various embodiments.

Figure 5B:
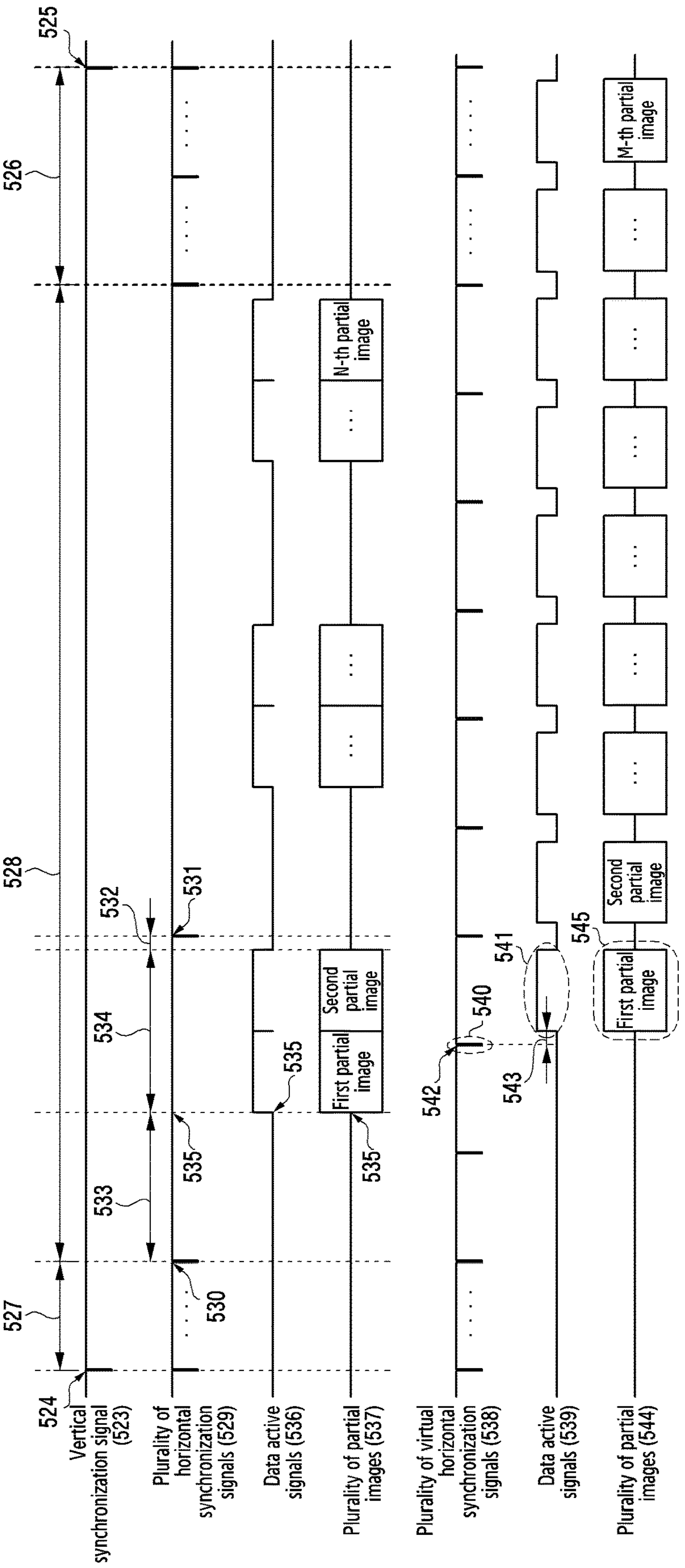
FIG. 5B illustrates another example of the signals used in the electronic device which performs 2.25-times up-scaling according to various embodiments.

FIG. 5B illustrates another example of the signals used in the electronic device which performs 2.25-times up-scaling according to various embodiments.

Referring to FIG. 3, an electronic device 300 may include a processor 310, a Display Driver Integrated Circuit (DDIC) 320, and a display panel 330.

The processor 310 may include the processor 120 of FIG. 1. The DDIC 320 may include the DDI 230 of FIG. 2. The display panel 330 may include the display 210 of FIG. 2.

In various embodiments, the processor 310 may generate an image to be displayed through the display panel 330. For example, the processor 310 may generate the image by using an application installed in the electronic device 300. In various embodiments, the processor 310 may compress the generated image by using a compression encoder.

In various embodiments, the processor 310 may transmit information on the image to be displayed on the display panel 330 to the DDIC 320. In various embodiments, the information on the image may be transmitted from the processor 310 to the DDIC 320 through an interface operatively connecting or coupling the processor 310 and the DDIC 320. In various embodiments, the interface may include a Mobile Industry Processor Interface (MIPI). In various embodiments, when the DDIC 320 which receives the information on the image displays the image without processing of the image (e.g., up-scaling of the image), the image may be displayed at a first resolution. For example, when the DDIC 320 displays the image without the processing of the image, the image may be displayed at a High Definition (HD) standard resolution. As another example, when the DDIC 320 displays the image without the processing of the image, the image may be displayed at a Full-HD (FHD) standard resolution. However, the disclosure is not limited thereto.

In various embodiments, the processor 310 may split the image to be displayed at the first resolution into a plurality of partial images through the display panel 330. In various embodiments, the plurality of partial images may be split by a plurality of horizontal lines.

In various embodiments, the processor 310 may transmit information on each of the plurality of partial images, based on a horizontal synchronization signal. In various embodiments, the horizontal synchronization signal may be used in the electronic device 300 to define a timing at which the information on each of the plurality of images is transmitted (or displayed). For example, when the processor 310 transmits a k-th partial image (where k is a natural number greater than or equal to 1 and less than or equal to N) among N partial images split by using the plurality of horizontal lines from the image which is capable of being displayed at the first resolution, the processor 310 may transmit the k-th partial image to the DDIC 320, based on a k-th horizontal synchronization signal among the N horizontal synchronization signals generated within an interval of one horizontal synchronization signal.

In various embodiments, the horizontal synchronization signal may include porch intervals. For example, the horizontal synchronization signal may include a front porch interval and a back porch interval. In various embodiments, when the image is up-scaled in the DDIC 320 and the up-scaled image is displayed through the display panel 330 in order to convert a resolution of the image which is capable of being displayed at the first resolution into a second resolution higher than the first resolution, the horizontal resolution signal may include a porch interval having a longer length than another horizontal synchronization signal used to display the image without the up-scaling. For example, a length of a porch interval included in the horizontal synchronization signal used to transmit each of the plurality of partial images when there is a request for converting the resolution of the image from the first resolution to the second resolution in the electronic device 300 may be longer than a length of a porch interval included in another horizontal synchronization signal used to transmit each of the plurality of partial images when there is no request for converting the resolution of the image to the first resolution in the electronic device 300. For example, the horizontal synchronization signal may include a porch interval having a longer length than the porch interval included in the different horizontal synchronization signal, so that the DDIC 320 can secure a time interval for performing up-scaling to convert the first resolution to the second resolution. For example, a length of a back porch interval included in the horizontal synchronization signal may be longer than a length of a back porch interval included in the different horizontal synchronization signal. As another example, a length of a front porch interval included in the horizontal synchronization signal may be longer than a length of a front porch interval included in the different horizontal synchronization signal. As another example, a length of a porch interval included in the horizontal synchronization signal may be longer than a length of a time interval requested by the processor 310 to transmit information on a partial image among the plurality of partial images. As another example, the length of the porch interval included in the horizontal synchronization signal may be determined differently according to a ratio of the first resolution to the second resolution. As another example, the length of the porch interval included in the horizontal synchronization signal may be determined differently according to a length of time required for up-scaling performed to convert the resolution of the image from the first resolution to the second resolution. However, the disclosure is not limited thereto.

In various embodiments, the horizontal synchronization signal may be generated by a timing controller 324 inside the DDIC 320, and may be provided from the DDIC 320 to the processor 310. In various embodiments, the horizontal synchronization signal may be generated by a timing signal generator outside the DDIC 320. The timing signal generator may be included inside the processor 310, or may be included outside the processor 310. The horizontal synchronization signal generated by the timing signal generator may be provided to the processor 310 and the timing controller 324 inside the DDIC 320. However, the disclosure is not limited thereto.

In various embodiments, in order for the length of the porch interval included in the horizontal synchronization signal to be extended to be longer than the porch interval included in the different horizontal synchronization signal, the processor 310 may transmit to the DDIC 320 a command for indicating that the image is displayed at the second resolution higher than the first resolution, before the information on the image (or the information on each of the plurality of partial images) is transmitted. In various embodiments, in order for the length of the porch interval included in the horizontal synchronization signal to be extended to be longer than the length of the porch interval included in the different horizontal synchronization signal, the processor 310 may transmit to the DDIC 320 a command for indicating that the image is displayed at the second resolution higher than the first resolution, together with the information on the image (or the information on each of the plurality of partial images). In various embodiments, the command may be transmitted from the processor 310 to the DDIC 320 through another interface distinct from the interface operatively coupling the processor 310 and the DDIC 320. For example, the command may be transmitted from the processor 310 to the DDIC 320 through a Serial Peripheral Interface (SPI) or an Inter-Integrated Circuit (I2C).

In various embodiments, the DDIC 320 may receive the information on the image from the processor 310. For example, the DDIC 320 may receive the information on each of the plurality of partial images split from the image. For example, the DDIC 320 may receive from the processor 310 the information on each of the plurality of images, transmitted based on the horizontal synchronization signal including the porch interval having the longer length than the porch interval included in the different horizontal synchronization signal.

In various embodiments, the DDIC 320 may perform an operation for displaying the plurality of partial images through the display panel 330, without an operation of storing the received information on each of the plurality of partial images in an internal memory (e.g., a Graphic Random Access Memory (GRAM)) inside the DDIC 320. In some embodiments, the DDIC 320 may not include the internal memory for storing information on each of the plurality of partial images received from the processor 310. When the DDIC 320 does not include the internal memory, in response to receiving the information on the plurality of partial images from the processor 310, the DDIC 320 may perform an operation of displaying the plurality of images through the display panel 330, without an operation of writing and scanning the information on each of the plurality of partial images in the internal memory. In some other embodiments, although the internal memory is included to store the information on each of the plurality of partial images, received from the processor 310, the DDIC 320 may operate in a mode in which the user of the internal memory is not required during the information on each of the plurality of partial images is received. For example, when the interface operatively coupling the processor 310 and the DDIC 320 is an MIPI, between a common mode of the MIPI standard and a video mode of the MIPI standard, the DDIC 320 may operate in the video mode, during the information on each of the plurality of partial images is received. Duding operating in the video mode, the DDIC 320 may perform operations for displaying each of the plurality of partial images through the display panel 330 while bypassing storing of the information on each of the plurality of partial images. However, the disclosure is not limited thereto.

In various embodiments, the DDIC 320 may perform an operation of displaying the image in such a manner that the resolution of the image to be displayed is the second resolution higher than the first resolution, based on the information on each of the plurality of partial images. For example, the DDIC 320 may up-scale each of the plurality of partial images, by using an up-scaler 326. For example, when the first resolution corresponds to an HD standard resolution and the second resolution corresponds to an FHD standard resolution, the DDIC 320 may up-scale each of the plurality of partial images by 2.25 times by using the up-scaler 326. As another example, when the first resolution corresponds to the HD standard resolution and the second resolution corresponds to a Wide Quad High Definition (WQHD) standard, each of the plurality of image may be up-scaled by 4 times, by using the up-scaler 326. However, the disclosure is not limited thereto. In various embodiments, when the image is compressed by the processor 310, after extracting the compressed image, the DDIC 320 may up-scale the extracted image. For example, after extracting the compressed image by using a compression decoder, the DDIC 320 may up-scale the extracted image.

In various embodiments, the DDIC 320 may use the up-scaler 326 to perform up-scaling by using a k-th partial image (where k is a natural number greater than or equal to 1 and less than or equal to N−1) and a (k+1)-th partial image among N partial images, thereby generating a l-th partial image (where 1 is a natural number greater than or equal to 1 and less than or equal to M) among M partial images split from the image to be displayed at the second resolution. In various embodiments, the DDIC 320 may temporarily store information on the k-th partial image and (k+)-th partial image in a line buffer (not shown in FIG. 3) operatively coupled to the up-scaler 326, in order to perform up-scaling by using the k-th partial image and the (k+1)-th partial image. The line buffer may be included inside the DDIC 320, or may be included outside the DDIC 320.

In various embodiments, the DDIC 320 may perform the up-scaling based on the command received from the processor 310 before receiving the information on the image (information on each of the plurality of partial images), or may perform the up-scaling based on the command received from the processor 310 together with the information on the image (or the image on each of the plurality of partial images). In various embodiments, the command received from the processor 310 may be processed by a command controller 322. In various embodiments, the DDIC 320 may perform the up-scaling, based on the processing of the command of the command controller 322. However, the disclosure is not limited thereto.

In various embodiments, the DDIC 320 may generate each of the plurality of virtual horizontal synchronization signals, by using the timing controller 324, in order to indicate a timing for performing the up-scaling. For example, each of the virtual horizontal synchronization signals may be generated every specified period, in order to indicate a start timing of the up-scaling. The specified period may be shorter than a period of the horizontal synchronization signal. The specified period may be determined based on a relative ratio of the first resolution and the second resolution. For example, when the first resolution corresponds to the HD standard resolution and the second resolution corresponds to the FHD standard resolution, the specified period may be ⅓ of the period of the horizontal synchronization signal. As another example, when the first resolution corresponds to the HD standard resolution and the second resolution corresponds to the WQHD standard resolution, the specified period may be ½ of the period of the horizontal synchronization signal. However, the disclosure is not limited thereto. In various embodiments, information on the specified period may be transmitted from the processor 310 to the DDIC 320. In various embodiments, the DDIC 320 may generate each of the virtual horizontal synchronization signals, based on information on the specified period.

In various embodiments, some signals among the virtual horizontal synchronization signals may be generated within a time interval corresponding to the porch interval of the horizontal synchronization signal. In various embodiments, the other signals among the virtual horizontal synchronization signals may be generated at a start timing of the horizontal synchronization signal. However, the disclosure is not limited thereto.

As another example, referring to FIG. 4A, the processor 310 and the DDIC 320 may perform operations for up-scaling an image by 4 times (e.g., up-scaling the HD standard resolution to the WQHD standard resolution). For example, the DDIC 320 may generate or receive a vertical synchronization signal 400 to display the image through the display panel 330, based on information received from the processor 310. In various embodiments, a period of the vertical synchronization signal 400 may have a length corresponding to a time interval from a timing 401 to a timing 402. In various embodiments, the vertical synchronization signal 400 may include a front porch interval 403, a back porch interval 404, and a display active interval 405. In various embodiments, a length of the display active interval 405 may correspond to a vertical length of the image having the second resolution to be converted from the first resolution. In various embodiments, the DDIC 320 may generate or receive a plurality of horizontal synchronization signals 406 within the display active interval 405 in the vertical synchronization signal 400. In various embodiments, each of the plurality of horizontal synchronization signals 406 may have a length corresponding to a time interval from a timing 407 to a timing 408. In various embodiments, each of the plurality of horizontal synchronization signals 406 may include a front porch interval 409, a back porch interval 410, and a display active interval 411. In various embodiments, a length of the front porch interval 409 may correspond to a length of a time interval required to up-scale the resolution of the image from the first resolution to the second resolution. In various embodiments, for the up-scaling, the front porch interval 409 may be extended to be longer than the length of the back porch interval 410. In various embodiments, the length of the front porch interval 409 may be longer than the length of the front porch interval included in the different horizontal synchronization signal used to display the image without the up-scaling. In various embodiments, the length of the front porch interval 409 may be extended by means of the DDIC 320 or the timing controller 324 inside the DDIC 320, based on receiving of the command in the DDIC 320. In various embodiments, the length of the front porch interval 409 may be extended by means of the timing signal generator outside the DDIC 320, based on receiving of the command in the DDIC 320. However, the disclosure is not limited thereto. Meanwhile, in various embodiments, the length of the display active interval 411 may correspond to a horizontal length of each of the plurality of partial images split from the image which is capable of being displayed at the first resolution.

In various embodiments, the DDIC 320 may provide or transmit data active signals 413 for indicating a time interval during which each of the plurality of partial images is transmitted to the processor 310 at a start timing 412 of the display active interval 411. In various embodiments, a length of an interval of each of the data active signals 413 may correspond to a length of the display active interval 411. In various embodiments, the processor 310 may provide or transmit information on each of a plurality of partial images 414 to the DDIC 320, in response to receiving each of the data active signals 413. For example, the processor 310 may provide information on one partial image among the plurality of partial images 414 to the processor 310 at the start timing 412 of the display active interval 411.

Meanwhile, in various embodiments, the DDIC 320 may generate a plurality of virtual horizontal synchronization signals 415 for respectively up-scaling the plurality of partial images 414. For example, the DDIC 320 may generate the plurality of virtual horizontal synchronization signals 415 for respectively up-scaling the plurality of partial images 414, based on receiving of the command from the processor 310.

In various embodiments, the DDIC 320 may generate data active signals 416 for respectively up-scaling the plurality of partial images 414, respectively based on the plurality of virtual horizontal synchronization signals 415. For example, the DDIC 320 may generate a data active signal 418 for up-scaling the single partial image received from the processor 310 at the start timing 412 of the display active interval 411 among the plurality of partial images 414, based on a first virtual horizontal synchronization signal 417 among the plurality of virtual horizontal synchronization signals 415. For example, the data active signal 418 may be generated when a specified time interval 419 elapses from the timing 407, based on the first virtual horizontal synchronization signal 417. In various embodiments, the data active signal 418 may be provided to the up-scalier 326.

In various embodiments, the DDIC 320 may generate a plurality of partial images 420 configuring the image to be displayed at the second resolution by respectively up-scaling the plurality of partial images 414, respectively based on the data active signals 416. For example, the DDIC 320 may generate one partial image 421 among the plurality of partial images 420 configuring the image to be displayed at the second resolution by up-scaling the single partial image received from the processor 310 at the start timing 412 of the display active interval 411, based on the data active signal 418.

In various embodiments, the DDIC 320 may display the image having the second resolution through the display panel 330, based on the generated plurality of partial images 420.

As another example, referring to FIG. 4B, the processor 310 and the DDIC 320 may perform operations for up-scaling an image by 4 times (e.g., up-scaling the HD standard resolution to the WQHD standard resolution). For example, the DDIC 320 may generate or receive a vertical synchronization signal 422 to display the image through the display panel 330, based on information received from the processor 310. In various embodiments, a period of the vertical synchronization signal 422 may have a length corresponding to a time interval from a timing 423 to a timing 424. In various embodiments, the vertical synchronization signal 422 may include a front porch interval 425, a back porch interval 426, and a display active interval 427. In various embodiments, a length of the display active interval 427 may correspond to a vertical length of the image having the second resolution to be converted from the first resolution. In various embodiments, the DDIC 320 may generate or receive a plurality of horizontal synchronization signals 428 within the display active interval 427 in the vertical synchronization signal 422. In various embodiments, each of the plurality of horizontal synchronization signals 428 may have a length corresponding to a time interval from a timing 429 to a timing 430. In various embodiments, each of the plurality of horizontal synchronization signals 428 may include a front porch interval 431, a back porch interval 432, and a display active interval 433. In various embodiments, a length of the back porch interval 432 may correspond to a length of a time interval required to up-scale the resolution of the image from the first resolution to the second resolution. In various embodiments, for the up-scaling, the back porch interval 432 may be extended to be longer than the length of the front porch interval 431. In various embodiments, the length of the back porch interval 432 may be longer than the length of the back porch interval included in the different horizontal synchronization signal used to display the image without the up-scaling. In various embodiments, the length of the back porch interval 432 may be extended by means of the DDIC 320 or the timing controller 324 inside the DDIC 320, based on receiving of the command in the DDIC 320. In various embodiments, the length of the back porch interval 432 may be extended by means of the timing signal generator outside the DDIC 320, based on receiving of the command in the DDIC 320. However, the disclosure is not limited thereto. Meanwhile, in various embodiments, the length of the display active interval 433 may correspond to a horizontal length of each of the plurality of partial images split from the image which is capable of being displayed at the first resolution.

In various embodiments, the DDIC 320 may provide or transmit data active signals 435 for indicating a time interval during which each of the plurality of partial images is transmitted to the processor 310 at a start timing 434 of the display active interval 433. In various embodiments, a length of an interval of each of the data active signals 435 may correspond to a length of the display active interval 433. In various embodiments, the processor 310 may provide or transmit information on each of a plurality of partial images 436 to the DDIC 320, in response to receiving each of the data active signals 435. For example, the processor 310 may provide information on one partial image among the plurality of partial images 436 to the processor 310 at the start timing 434 of the display active interval 433.

Meanwhile, in various embodiments, the DDIC 320 may generate a plurality of virtual horizontal synchronization signals 437 for respectively up-scaling the plurality of partial images 436. For example, the DDIC 320 may generate the plurality of virtual horizontal synchronization signals 437 for respectively up-scaling the plurality of partial images 436, based on receiving of the command from the processor 310.

In various embodiments, the DDIC 320 may generate data active signals 438 for respectively up-scaling the plurality of partial images 436, respectively based on the plurality of virtual horizontal synchronization signals 437. For example, the DDIC 320 may generate a data active signal 440 for up-scaling the single partial image received from the processor 310 at the start timing 434 of the display active interval 433 among the plurality of partial images 436, based on a first virtual horizontal synchronization signal 439 among the plurality of virtual horizontal synchronization signals 437. For example, the data active signal 440 may be generated when a specified time interval 441 elapses from the timing 434, based on the first virtual horizontal synchronization signal 439. In various embodiments, the data active signal 440 may be provided to the up-scalier 326.

In various embodiments, the DDIC 320 may generate a plurality of partial images 442 configuring the image to be displayed at the second resolution by respectively up-scaling the plurality of partial images 436, respectively based on the data active signals 438. For example, the DDIC 320 may generate one partial image 443 among the plurality of partial images 442 configuring the image to be displayed at the second resolution by up-scaling the single partial image received from the processor 310 at the start timing 434 of the display active interval 433, based on the data active signal 440.

In various embodiments, the DDIC 320 may display the image having the second resolution through the display panel 330, based on the generated plurality of partial images 442.

As another example, referring to FIG. 5A, the processor 310 and the DDIC 320 may perform operations for up-scaling the image by 2.25 times (e.g., up-scaling the HD standard resolution to the FHD standard resolution). For example, the DDIC 320 may generate or receive a vertical synchronization signal 500, in order to display the image through the display panel 330, based on information received from the processor 310. In various embodiments, a period of the vertical synchronization signal 500 may have a length corresponding to a time interval from a timing 501 to a timing 502. In various embodiments, the vertical synchronization signal 500 may include a front porch interval 503, a back porch interval 504, and a display active interval 505. In various embodiments, a length of the display active interval 505 may correspond to a vertical length of the image having the second resolution to be converted from the first resolution. In various embodiments, the DDIC 320 may generate or receive a plurality of horizontal synchronization signals 506 within the display active interval 505 in the vertical synchronization signal 500. In various embodiments, each of the plurality of horizontal synchronization signals 506 may have a length corresponding to a time interval from a timing 507 to a timing 508. In various embodiments, each of the plurality of horizontal synchronization signals 506 may include a front porch interval 509, a back porch interval 510, and a display active interval 511. In various embodiments, a length of the front porch interval 509 may correspond to a length of a time interval required to up-scale the resolution of the image from the first resolution to the second resolution. In various embodiments, for the up-scaling, the front porch interval 509 may be extended to be longer than the length of the back porch interval 510. In various embodiments, the length of the front porch interval 509 may be longer than the length of the front porch interval included in the different horizontal synchronization signal used to display the image without the up-scaling. In various embodiments, the length of the front porch interval 509 may be extended by means of the DDIC 320 or the timing controller 324 inside the DDIC 320, based on receiving of the command in the DDIC 320. In various embodiments, the length of the front porch interval 509 may be extended by means of the timing signal generator outside the DDIC 320, based on receiving of the command in the DDIC 320. However, the disclosure is not limited thereto. Meanwhile, in various embodiments, the length of the display active interval 511 may correspond to a horizontal length of two partial images among the plurality of partial images split from the image which is capable of being displayed at the first resolution. In FIG. 5A, since the DDIC 320 performs up-scaling by 1.5 times in a horizontal direction, the length of the display active interval 511 may correspond to a horizontal length of two partial images among the plurality of partial images split from the image which is capable of being displayed at the first resolution.

In various embodiments, the DDIC 320 may provide or transmit data active signals 513 for indicating a time interval during which each of the plurality of partial images is transmitted to the processor 310 at a start timing 512 of the display active interval 511. In various embodiments, a length of an interval of each of the data active signals 513 may correspond to a length of the display active interval 511. In various embodiments, the processor 310 may provide or transmit information on each of a plurality of partial images 514 to the DDIC 320, in response to receiving each of the data active signals 513. For example, the processor 310 may provide information on one partial image among the plurality of partial images 514 to the processor 310 at the start timing 512 of the display active interval 511. In FIG. 5A, since the DDIC 320 performs up-scaling by 1.5 times in a horizontal direction, the processor 310 may provide the DDIC 320 with information on two partial images among the plurality of partial images 514.

Meanwhile, in various embodiments, the DDIC 320 may generate a plurality of virtual horizontal synchronization signals 515 for respectively up-scaling the plurality of partial images 514. For example, the DDIC 320 may generate the plurality of virtual horizontal synchronization signals 515 for respectively up-scaling the plurality of partial images 514, based on receiving of the command from the processor 310.

In various embodiments, the DDIC 320 may generate data active signals 516 for respectively up-scaling the plurality of partial images 514, respectively based on the plurality of virtual horizontal synchronization signals 515. For example, the DDIC 320 may generate a data active signal 518 for up-scaling a first partial image between two partial images received from the processor 310 at the start timing 512 of the display active interval 511 among the plurality of partial images 514, based on a first virtual horizontal synchronization signal 517 among the plurality of virtual horizontal synchronization signals 515. For example, the data active signal 518 may be generated when a specified time interval 520 elapses from a timing 519, based on the first virtual horizontal synchronization signal 517. In various embodiments, the data active signal 518 may be provided to the up-scalier 326.

In various embodiments, the DDIC 320 may generate a plurality of partial images 521 configuring the image to be displayed at the second resolution by respectively up-scaling the plurality of partial images 514, respectively based on the data active signals 516. For example, the DDIC 320 may generate one partial image 522 among the plurality of partial images 521 configuring the image to be displayed at the second resolution by up-scaling the first partial image between two partial images received from the processor 310 at the start timing 512 of the display active interval 511, based on the data active signal 518.

In various embodiments, the DDIC 320 may display the image having the 30 second resolution through the display panel 330, based on the generated plurality of partial images 521.

As another example, referring to FIG. 5B, the processor 310 and the DDIC 320 may perform operations for up-scaling the image by 2.25 times (e.g., up-scaling the HD standard resolution to the FHD standard resolution). For example, the DDIC 320 may generate or receive a vertical synchronization signal 523, in order to display the image through the display panel 330, based on information received from the processor 310. In various embodiments, a period of the vertical synchronization signal 523 may have a length corresponding to a time interval from a timing 524 to a timing 525. In various embodiments, the vertical synchronization signal 523 may include a front porch interval 526, a back porch interval 527, and a display active interval 528. In various embodiments, a length of the display active interval 528 may correspond to a vertical length of the image having the second resolution to be converted from the first resolution. In various embodiments, the DDIC 320 may generate or receive a plurality of horizontal synchronization signals 529 within the display active interval 528 in the vertical synchronization signal 523. In various embodiments, each of the plurality of horizontal synchronization signals 529 may have a length corresponding to a time interval from a timing 530 to a timing 531. In various embodiments, each of the plurality of horizontal synchronization signals 529 may include a front porch interval 532, a back porch interval 533, and a display active interval 534. In various embodiments, a length of the back porch interval 533 may correspond to a length of a time interval required to up-scale the resolution of the image from the first resolution to the second resolution. In various embodiments, for the up-scaling, the back porch interval 533 may be extended to be longer than the length of the front porch interval 532. In various embodiments, the length of the back porch interval 533 may be longer than the length of the back porch interval included in the different horizontal synchronization signal used to display the image without the up-scaling. In various embodiments, the length of the back porch interval 533 may be extended by means of the DDIC 320 or the timing controller 324 inside the DDIC 320, based on receiving of the command in the DDIC 320. In various embodiments, the length of the back porch interval 533 may be extended by means of the timing signal generator outside the DDIC 320, based on receiving of the command in the DDIC 320. However, the disclosure is not limited thereto. Meanwhile, in various embodiments, the length of the display active interval 534 may correspond to a horizontal length of two partial images among the plurality of partial images split from the image which is capable of being displayed at the first resolution. In FIG. 5B, since the DDIC 320 performs up-scaling by 1.5 times in a horizontal direction, the length of the display active interval 534 may correspond to a horizontal length of two partial images among the plurality of partial images split from the image which is capable of being displayed at the first resolution.

In various embodiments, the DDIC 320 may provide or transmit data active signals 536 for indicating a time interval during which each of the plurality of partial images is transmitted to the processor 310 at a start timing 535 of the display active interval 534. In various embodiments, a length of an interval of each of the data active signals 536 may correspond to a length of the display active interval 534. In various embodiments, the processor 310 may provide or transmit information on each of a plurality of partial images 537 to the DDIC 320, in response to receiving each of the data active signals 536. For example, the processor 310 may provide information on one partial image among the plurality of partial images 537 to the processor 310 at the start timing 535 of the display active interval 534. In FIG. 5B, since the DDIC 320 performs up-scaling by 1.5 times in a horizontal direction, the processor 310 may provide the DDIC 320 with information on two partial images among the plurality of partial images 537.

Meanwhile, in various embodiments, the DDIC 320 may generate a plurality of virtual horizontal synchronization signals 538 for respectively up-scaling the plurality of partial images 537. For example, the DDIC 320 may generate the plurality of virtual horizontal synchronization signals 538 for respectively up-scaling the plurality of partial images 537, based on receiving of the command from the processor 310.

In various embodiments, the DDIC 320 may generate data active signals 539 for respectively up-scaling the plurality of partial images 537, respectively based on the plurality of virtual horizontal synchronization signals 538. For example, the DDIC 320 may generate a data active signal 541 for up-scaling a first partial image between two partial images received from the processor 310 at the start timing 535 of the display active interval 534 among the plurality of partial images 537, based on a first virtual horizontal synchronization signal 540 among the plurality of virtual horizontal synchronization signals 538. For example, the data active signal 541 may be generated when a specified time interval 543 elapses from a timing 542, based on the first virtual horizontal synchronization signal 540. In various embodiments, the data active signal 541 may be provided to the up-scalier 326.

In various embodiments, the DDIC 320 may generate a plurality of partial images 544 configuring the image to be displayed at the second resolution by respectively up-scaling the plurality of partial images 537, respectively based on the data active signals 539. For example, the DDIC 320 may generate one partial image 545 among the plurality of partial images 544 configuring the image to be displayed at the second resolution by up-scaling the first partial image between two partial images received from the processor 310 at the start timing 535 of the display active interval 534, based on the data active signal 541.

In various embodiments, the DDIC 320 may display the image having the second resolution through the display panel 330, based on the generated plurality of partial images 544.

As described above, when it is required to perform up-scaling in the DDIC 320 to convert a resolution, the electronic device 300 according to various embodiments may extend a length of a porch interval of a horizontal synchronization signal used in at least one of the processor 310 and the DDIC 320, thereby securing a time for performing the up-scaling. The electronic device 300 according to various embodiments may more effectively provide a high-quality image, through the extension of the porch interval of the horizontal synchronization signal. For example, the electronic device 101 according to various embodiments may secure the time for performing the up-scaling, thereby decreasing an amount of power consumption required to display an image.

As described above, an electronic device (e.g., the electronic device 300) according to various embodiments may include a display panel (e.g., the display panel 330), a Display Driving Integrated Circuit (DDIC) (e.g., the DDIC 320) operatively coupled to the display panel, and a processor (e.g., the processor 310) operatively coupled to the DDIC. The DDIC may be configured to receive, from the processor, first data transmitted based on a horizontal synchronization signal including a first porch interval to display an image at a first resolution, obtain second data to display the image at a second resolution higher than the first resolution, based at least on the first data, and display the image at the second resolution by using the display panel, based on the obtained second data. A length of the first porch interval may be longer than a length of a second porch interval included in a horizontal synchronization signal used to display the image at the first resolution.

In various embodiments, the length of the first porch interval may be longer than a length of a time interval for receiving the first data. In various embodiments, the second data may be used to display part of the image at the second resolution in at least part of a line among a plurality of horizontal lines configuring a display area of the display panel. In various embodiments, the DDIC may be configured to obtain the second data further based on third data received based on the horizontal synchronization signal including the first porch interval from the processor to display the image at the first resolution in another line below the line among the plurality of horizontal lines.

In various embodiments, the DDIC may be configured to obtain the second data converted from the first data by up-scaling the first data. In various embodiments, the DDIC may be further configured to generate a virtual horizontal synchronization signal configured to perform the up-scaling of the first data every period shorter than a period of the horizontal synchronization signal including the first porch interval. In various embodiments, the virtual horizontal synchronization signal may be generated within a time interval corresponding to the first porch interval.

In various embodiments, the DDIC may not include an internal memory which records the first data received from the processor.

In various embodiments, the DDIC may be operatively coupled to the processor through a Mobile Industry Processor Interface (MIPI), and may be configured to receive the first data for displaying the image at the first resolution, based on a video mode of the MIPI.

In various embodiments, the first porch interval may include at least one of a front porch interval of the horizontal synchronization signal and a back porch interval of the horizontal synchronization signal.

In various embodiments, a length of the first porch interval may be changed depending on a relative ratio of the first resolution and the second resolution.

In various embodiments, the DDIC may be configured to obtain the second 30 data, based at least on the first data, within the first porch interval having the length longer than the second porch interval.

As described above, an electronic device (e.g., the electronic device 300) according to various embodiments may include a display panel (e.g., the display panel 330), a DDIC (e.g., the DDIC 320) operatively coupled to the display panel, and a processor (e.g., the processor 310) operatively coupled to the DDIC. The DDIC may be configured to receive, from the processor, a signal indicating that a first resolution is to be converted to a second resolution while displaying an image at the first resolution through the display panel, based on a horizontal synchronization signal including a first porch interval, change a length of the porch interval in response to the reception, and display the image at the second resolution through the display panel, based on the horizontal synchronization signal including the porch interval having the changed length.

In various embodiments, the DDIC may be configured to change the length of the porch interval, based on a ratio of the first resolution to the second resolution, in response to the reception.

In various embodiments, the DDIC may be configured to obtain another data by up-scaling data received from the processor within the porch interval having the changed length and display the image at the second resolution through the display panel by using the obtained another data. In various embodiments, the different data may be obtained before another horizontal synchronization signal subsequent to the horizontal synchronization signal is generated. In various embodiments, the DDIC may be further configured to generate virtual horizontal synchronization signals for identifying a timing for obtaining the different data, before the different horizontal synchronization signal subsequent to the horizontal synchronization signal is generated, and the number of virtual horizontal synchronization signals may be identified based on a ratio of the first resolution to the second resolution. In various embodiments, the electronic device may include a first interface which couples the processor and the DDIC and a second interface which couples the processor and the DDIC. The signal may be transmitted from the processor to the DDIC through the first interface, and the data may be transmitted from the processor to the DDIC through the second interface. In various embodiments, the second interface may include a Mobile Industry Processor Interface (MIPI), and the DDIC may be configured to receive the signal while operating based on a video mode of the MIPI, change a length of the porch interval in response to the reception, and display the image at the second resolution, based on the horizontal synchronization signal including the porch interval having the changed length.

In various embodiments, the porch interval having the changed length may correspond to a front porch interval of the horizontal synchronization signal or a back porch interval of the horizontal synchronization signal.

Figure 6:
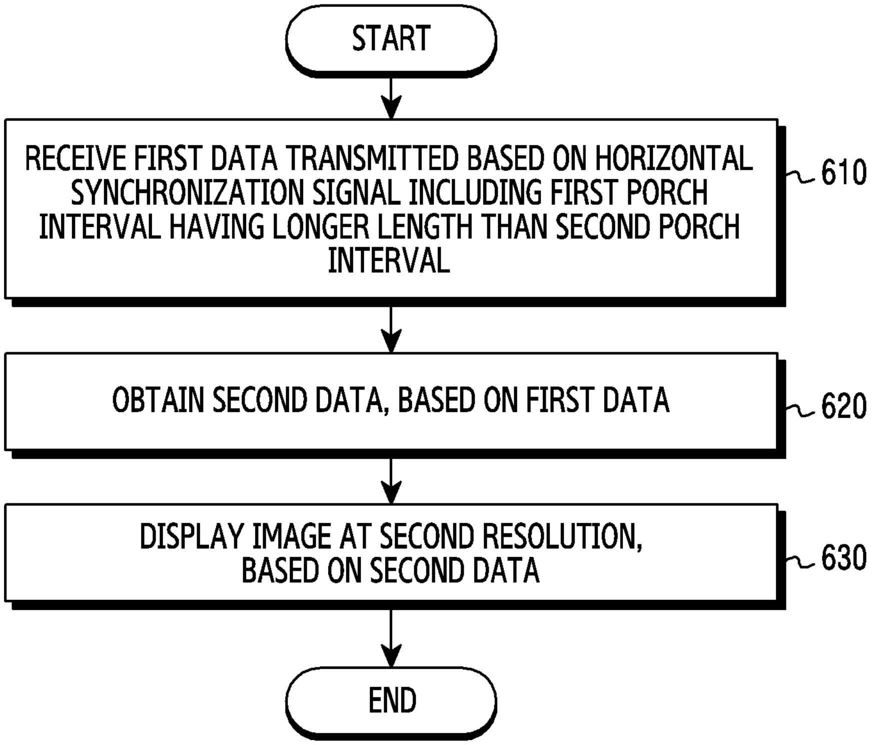
FIG. 6 illustrates an example of an operation of a Display Driver Integrated Circuit (DDIC) of an electronic device according to various embodiments.

FIG. 6 illustrates an example of an operation of a DDIC of an electronic device according to various embodiments. Such an operation may be performed by the display device 160 of FIG. 1, the DDI 230 of FIG. 2, or the DDIC 320 of FIG. 3.

Figure 7:
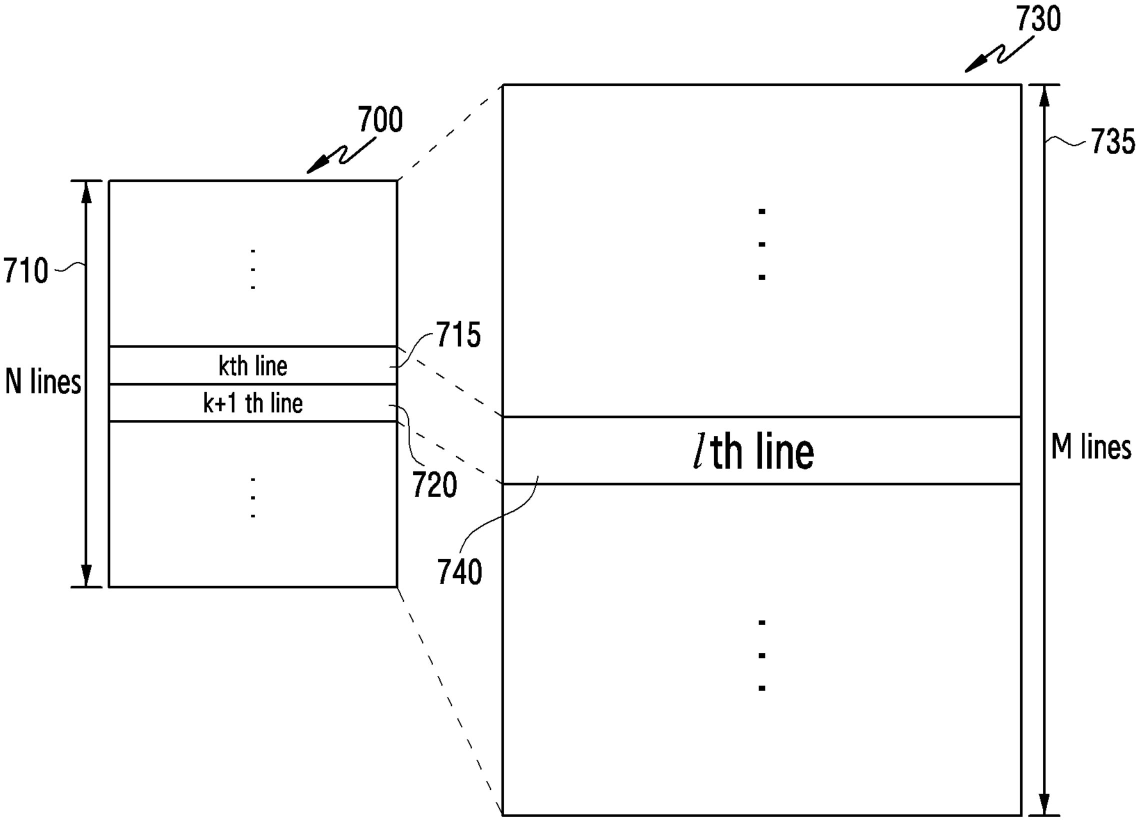
FIG. 7 illustrates an example of up-scaling performed in an electronic device according to various embodiments.

FIG. 7 illustrates an example of up-scaling performed in an electronic device according to various embodiments.

Referring to FIG. 6, in operation 610, the DDIC 320 may receive from the processor 310 first data to be transmitted based on a horizontal synchronization signal including a first porch interval having a longer length than a second porch curation. In various embodiments, the first data may be used to display an image at a first resolution. In various embodiments, the first data may be used to display part of the image within a line among a plurality of horizontal lines configuring a display area of the display panel 330. In various embodiments, the second porch interval may be included in another horizontal synchronization signal used when the image is displayed at the first resolution. In various embodiments, the length of the first porch interval may be longer than the length of the second porch interval, in order to secure a processing time required to convert the first data into second data for displaying the image at a second resolution higher than the first resolution. In various embodiments, the length of the first porch interval may be longer than a length of a time interval required to receive the first data. In various embodiments, the length of the first porch interval may be adjusted by the DDIC 320 or may be adjusted by an external timing signal generator of the DDIC 320. In various embodiments, the length of the first porch interval may be changed according to a ratio of the first resolution to the second resolution. However, the disclosure is not limited thereto.

In operation 620, the DDIC 320 may obtain the second data, based on the first data. For example, the DDIC 320 may obtain the second data by up-scaling the first data. For example, referring to FIG. 7, the DDIC 320 may perform up-scaling based on first data 715 corresponding to a k-th line among N horizontal lines 710 configuring an image 700 which is capable of being displayed at the first resolution and third data 720 corresponding to a (k+1)-th line among the N horizontal lines 710, thereby obtaining second data 740 corresponding to an l-th line among M horizontal lines 735 configuring an image 730 which is capable of being displayed at the second resolution. However, the disclosure is not limited thereto. In various embodiments, the DDIC 320 may obtain the second data, based on the first data, within the first porch interval having a longer length than the second porch interval.

In operation 630, the DDIC 320 may display the image through the display panel 330 at the second resolution, based on the second data.

As described above, the electronic device 101 according to various embodiments may secure a time for performing the up-scaling, by using the first porch interval having a longer length than the second porch interval. By extending the porch interval, the electronic device 300 according to various embodiments may display an image having a higher resolution than an image generated in the processor 310 through the display panel 330.

Figure 8:
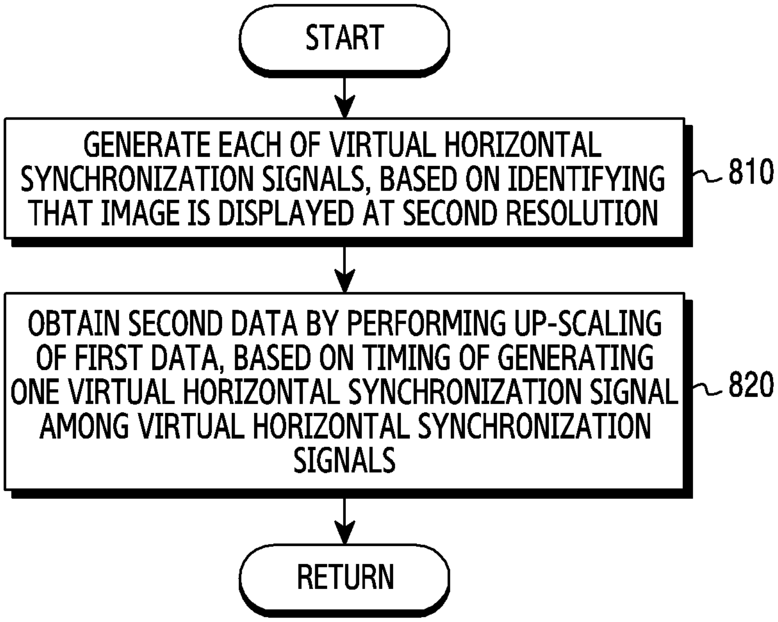
FIG. 8 illustrates an example of an operation of an electronic device for obtaining up-scaled data according to various embodiments.

FIG. 8 illustrates an example of an operation of an electronic device for obtaining up-scaled data according to various embodiments. Such an operation may be performed by the display device 160 of FIG. 1, the DDI 230 of FIG. 2, or the DDIC 320 of FIG. 3.

Referring to FIG. 8, in operation 810, the DDIC 320 may generate each of virtual horizontal synchronization signals, based on identifying that an image is to be displayed at a second resolution. For example, the DDIC 320 may receive from the processor 310 a command which provides a request of displaying an image at the second resolution up-scaled from a first resolution. In various embodiments, the command may be received through another reception path distinct from a reception path of the first data, defined through the description of FIG. 6. For example, the command may be received through the different interface defined through the description of FIG. 3. For example, the first data is received through an MIPI, whereas the command may be received through an SPI or an I2C. In various embodiments, the command may be received together with the first data, and may be received before the DDIC 320 receives the first data. In various embodiments, one virtual horizontal synchronization signal among the virtual horizontal synchronization signals may be generated to indicate a timing of up-scaling the first data. In various embodiments, the virtual horizontal synchronization signals may be generated every period shorter than a period of the horizontal synchronization signal, which includes the first porch interval. In various embodiments, some signals among the virtual horizontal synchronization signals may be generated within a time interval corresponding to the first porch interval.

In operation 820, the DDIC 320 may obtain the second data by performing up-scaling of the first data, based on a timing of generating one virtual horizontal synchronization signal among the virtual horizontal synchronization signals. For example, the DDIC 320 may obtain the second data by performing up-scaling of the first data within the first porch interval, based on the timing of generating the single virtual horizontal synchronization signal.

As described above, the electronic device 300 according to various embodiments may perform up-scaling of the first data within the first porch interval having an extended length, by using the virtual horizontal synchronization signal generated for the up-scaling in the display DDIC 320. Through the extended first porch interval, the electronic device 300 according to various embodiments may display an image having a higher resolution than the image generated in the processor 310 through the display panel 330.

Figure 9:
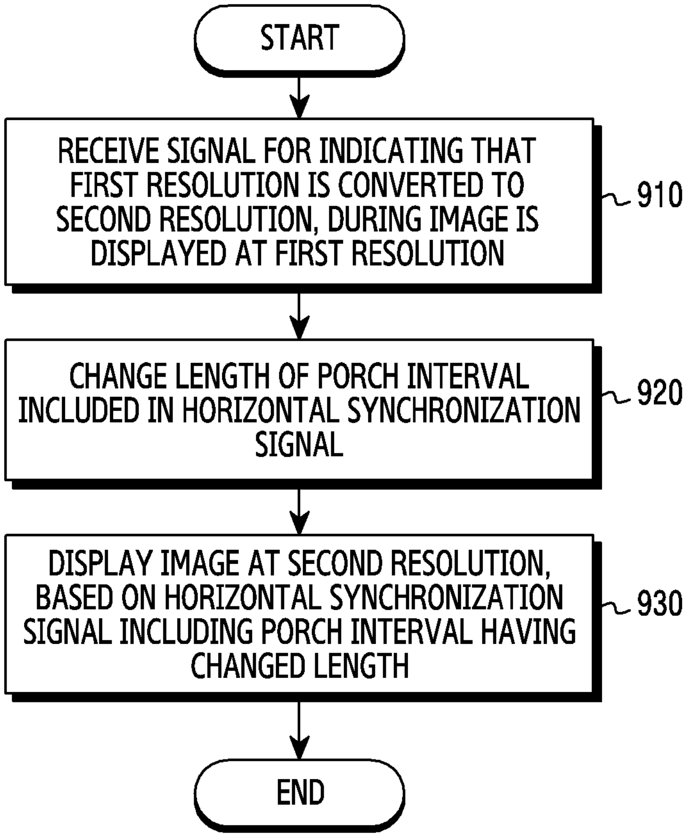
FIG. 9 illustrates another example of an operation of an electronic device according to various embodiments.

FIG. 9 illustrates another example of an operation of an electronic device according to various embodiments. Such an operation may be performed by the display device 160 of FIG. 1, the DDI 230 of FIG. 2, or the DDIC 320 of FIG. 3.

Referring to FIG. 9, in operation 910, the DDIC 320 may receive from the processor 310 a signal for indicating that a first resolution is converted to a second resolution, during an image is displayed through the display panel 330 at the first resolution, based on a horizontal synchronization signal including a porch interval having a first length. In various embodiments, the signal for indicating that the first resolution is converted to the second resolution may correspond to the command defined through the description of FIG. 3.

In operation 920, the DDIC 320 may change a length of the porch interval from the first length to a second length, in response to receiving the signal. For example, the DDIC 320 may change the length of the porch interval, based on a ratio of the first resolution to the second resolution, in response to the reception.

In operation 930, the DDIC 320 may display the image at the second resolution through the display panel 330, based on the horizontal synchronization signal including the porch interval having the changed length (e.g., the second length). For example, the DDIC 320 may obtain another data by up-scaling data received from the processor 310 within the porch interval having the changed length. The DDIC 320 may display the image at the second resolution through the display panel 330 by using the different data. In various embodiments, the different data may be obtained before another horizontal synchronization signal subsequent to the horizontal synchronization signal is generated. In various embodiments, the different horizontal synchronization signal may include the porch interval having the changed length. In various embodiments, the length of the different horizontal synchronization signal may correspond to the length of the horizontal synchronization signal.

In various embodiments, the DDIC 320 may generate virtual horizontal synchronization signals for identifying a timing for obtaining the different data, before generating the different horizontal synchronization signal. In various embodiments, the number of virtual horizontal synchronization signals may be identified based on a ratio of the first resolution to the second resolution. Based on a timing of generating one virtual horizontal synchronization signal among the virtual horizontal synchronization signals, the DDIC 320 may identify the porch interval having the changed length, and may obtain the different data by up-scaling the data received from the processor 310 in the porch interval.

As described above, the electronic device 300 according to various embodiments may change the length of the porch interval of the horizontal synchronization signal, based on a degree of up-scaling of an image, thereby securing a time for performing the up-scaling of the image. The electronic device 300 according to various embodiments may extend a timing for converting a resolution, through the change of the length of the porch interval.

As described above, a method for operating an electronic device according to various embodiments may include receiving, from the processor of the electronic device by a DDIC of the electronic device, first data to display an image at a first resolution, which is transmitted based on a horizontal synchronization signal including a second porch interval having a longer length than a first porch interval included in the horizontal synchronization signal used to display the image at the first resolution, based on the first data, obtaining, by the DDIC, second data to display the image at a second resolution higher than the first resolution, based at least on the first data, and displaying, by the DDIC, the image at the second resolution by using the display panel of the electronic device, based on the obtained second data.

In various embodiments, the second data may be used to display part of the image at the second resolution in at least part of a line among a plurality of horizontal lines configuring a display area of the display panel. In various embodiments, the obtaining of the second data may include obtaining, by the DDIC, the data second further based on third data received based on the horizontal synchronization signal including the first porch interval from the processor to display the image at the first resolution in another line below the line among the plurality of horizontal lines.

In various embodiments, the obtaining of the second data may include obtaining, by the DDIC, the second data converted from the first data by up-scaling the first data. In various embodiments, the method may further include generating, by the DDIC, a virtual horizontal synchronization signal configured to perform the up-scaling of the first data every period shorter than a period of the horizontal synchronization signal including the first porch interval. In various embodiments, the virtual horizontal synchronization signal may be generated within a time interval corresponding to the first porch interval.

In various embodiments, the receiving of the first data may include receiving, by the DDIC, the first data for displaying the image at the first resolution, based on a video mode of the MIPI.

In various embodiments, the first porch interval may include at least one of a front porch interval of the horizontal synchronization signal and a back porch interval of the horizontal synchronization signal.

In various embodiments, a length of the first porch interval may be changed depending on a relative ratio of the first resolution and the second resolution.

In various embodiments, the obtaining of the second data may include obtaining the second data, based at least on the first data, within the first porch interval having the length longer than the second porch interval.

As described above, a method of operating an electronic device according to various embodiments may include receiving, from the processor of the electronic device by a DDIC of the electronic device, a signal indicating that a first resolution is to be converted to a second resolution while displaying an image at the first resolution through the display panel of the electronic device, based on a horizontal synchronization signal including a first porch interval, changing, by the DDIC, a length of the porch interval in response to the reception, and displaying, by the DDIC, the image at the second resolution through the display panel, based on the horizontal synchronization signal including the porch interval having the changed length.

In various embodiments, the changing of the length of the porch interval may include changing, by the DDIC, the length of the porch interval, based on a ratio of the first resolution to the second resolution, in response to the reception.

In various embodiments, the displaying of the image at the second resolution may include obtaining, by the DDIC, another data by up-scaling data received from the processor within the porch interval having the changed length and displaying the image at the second resolution through the display panel by using the obtained another data. In various embodiments, the different data may be obtained before another horizontal synchronization signal subsequent to the horizontal synchronization signal is generated. In various embodiments, the method may further include, generating, by the DDIC, virtual horizontal synchronization signals for identifying a timing for obtaining the different data, before the different horizontal synchronization signal subsequent to the horizontal synchronization signal is generated, and the number of virtual horizontal synchronization signals may be identified based on a ratio of the first resolution to the second resolution. In various embodiments, the method may further include receiving the signal while operating based on a video mode of the MIPI, changing a length of the porch interval in response to the reception, and displaying the image at the second resolution, based on the horizontal synchronization signal including the porch interval having the changed length.

In various embodiments, the porch interval having the changed length may correspond to a front porch interval of the horizontal synchronization signal or a back porch interval of the horizontal synchronization signal.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

What is claimed is:

1. An electronic device comprising:

a display panel;

a Display Driving Integrated Circuit (DDIC) operatively coupled to the display panel; and a processor operatively coupled to the DDIC, wherein the DDIC is configured to:

receive, from the processor, first image data to display an image at a first resolution, which is transmitted based on a horizontal synchronization signal including a first porch interval;

obtain second image data to display the image at a second resolution higher than the first resolution, based at least on the first image data; and display the image at the second resolution by using the display panel, based on the obtained second image data, wherein a length of the first porch interval is changed, based on a relative ratio of the first resolution and the second resolution, to be longer than a length of a second porch interval included in a horizontal synchronization signal for displaying the image at the first resolution.

2. The electronic device of claim 1, wherein the length of the first porch interval is longer than a length of a time interval for receiving the first image data.

3. The electronic device of claim 2, wherein the second image data is used to display part of the image at the second resolution in at least part of a line among a plurality of horizontal lines configuring a display area of the display panel.

4. The electronic device of claim 3, wherein the DDIC is configured to obtain the second image data further based on third data received based on the horizontal synchronization signal including the first porch interval from the processor to display the image at the first resolution in another line below the line among the plurality of horizontal lines.

5. The electronic device of claim 1, wherein the DDIC is configured to obtain the second image data converted from the first image data by up-scaling the first image data.

6. The electronic device of claim 5, wherein the DDIC is further configured to generate a virtual horizontal synchronization signal configured to perform the up-scaling of the first image data every period shorter than a period of the horizontal synchronization signal including the first porch interval.

7. The electronic device of claim 6, wherein the virtual horizontal synchronization signal is generated within a time interval corresponding to the first porch interval.

8. The electronic device of claim 1, wherein the DDIC does not include an internal memory which stores the first image data received from the processor.

9. The electronic device of claim 1, wherein the DDIC is operatively coupled to the processor through a Mobile Industry Processor Interface (MIPI), and is configured to receive the first image data for displaying the image at the first resolution, based on a video mode of the MIPI.

10. The electronic device of claim 1, wherein the first porch interval includes at least one of a front porch interval of the horizontal synchronization signal and a back porch interval of the horizontal synchronization signal.

11. The electronic device of claim 1, wherein the DDIC is configured to obtain the second image data, based at least on the first image data, within the first porch interval having the length longer than the second porch interval.

12. An electronic device comprising:
- a display panel;
- a Display Driving Integrated Circuit (DDIC) operatively coupled to the display panel; and
- a processor operatively coupled to the DDIC,
- wherein the DDIC is configured to:
  - receive a signal for indicating that a first resolution is changed to a second resolution from the processor, while an image is displayed at the first resolution, based on a horizontal synchronization signal including a second porch interval;
  - change a length of the second porch interval to a length of a first porch interval, in response to the receiving of the signal; and
  - display the image at the second resolution through the display panel, based on the horizontal synchronization signal having the changed length of porch interval.

13. The electronic device of claim 12, wherein the DDIC is configured to change the length of the second porch interval based on a ratio of the first resolution to the second resolution in response to the receiving of the signal.

14. The electronic device of claim 12, wherein the DDIC is configured to:
- obtain second data by up-scaling first data received from the processor within the changed porch interval, and
- display the image at the second resolution through the display panel using the obtained second data.

15. The electronic device of claim 14, wherein the second data is obtained before another horizontal synchronization signal subsequent to the horizontal synchronization signal is generated.

16. The electronic device of claim 14, wherein the DDIC is configured to generate a virtual horizontal synchronization signal for identifying a timing for obtaining the second data, before another horizontal synchronization signal subsequent to the horizontal synchronization signal is generated, and the number of the virtual horizontal synchronization signal is identified based on a ratio of the first resolution to the second resolution.

17. The electronic device of claim 14, further comprising:
- a first interface connecting to the processor and the DDIC; and
- a second interface connecting the processor and the DDIC,
- wherein the signal is transmitted from the processor to the DDIC through the first interface, and
- wherein the first data is transmitted from the processor to the DDIC through the second interface.

18. The electronic device of claim 17, wherein the second interface comprises a Mobile Industry Processor Interface (MIPI), and
- wherein the DDIC is configured to receive the signal,
- change the length of the porch interval in response to the receiving of the signal, and
- display the image at the second resolution based on the horizontal synchronization signal including the changed porch interval, based on a video mode of the MIPI.

19. The electronic device of claim 12, wherein the changed porch interval corresponds to a front porch interval of the horizontal synchronization signal or a back porch interval of the horizontal synchronization signal.

* * * * *